Jan. 7, 1930. F. W. HUNT 1,742,352
AUTOMOTIVE VEHICLE STEERING DEVICE
Filed Jan. 29, 1926
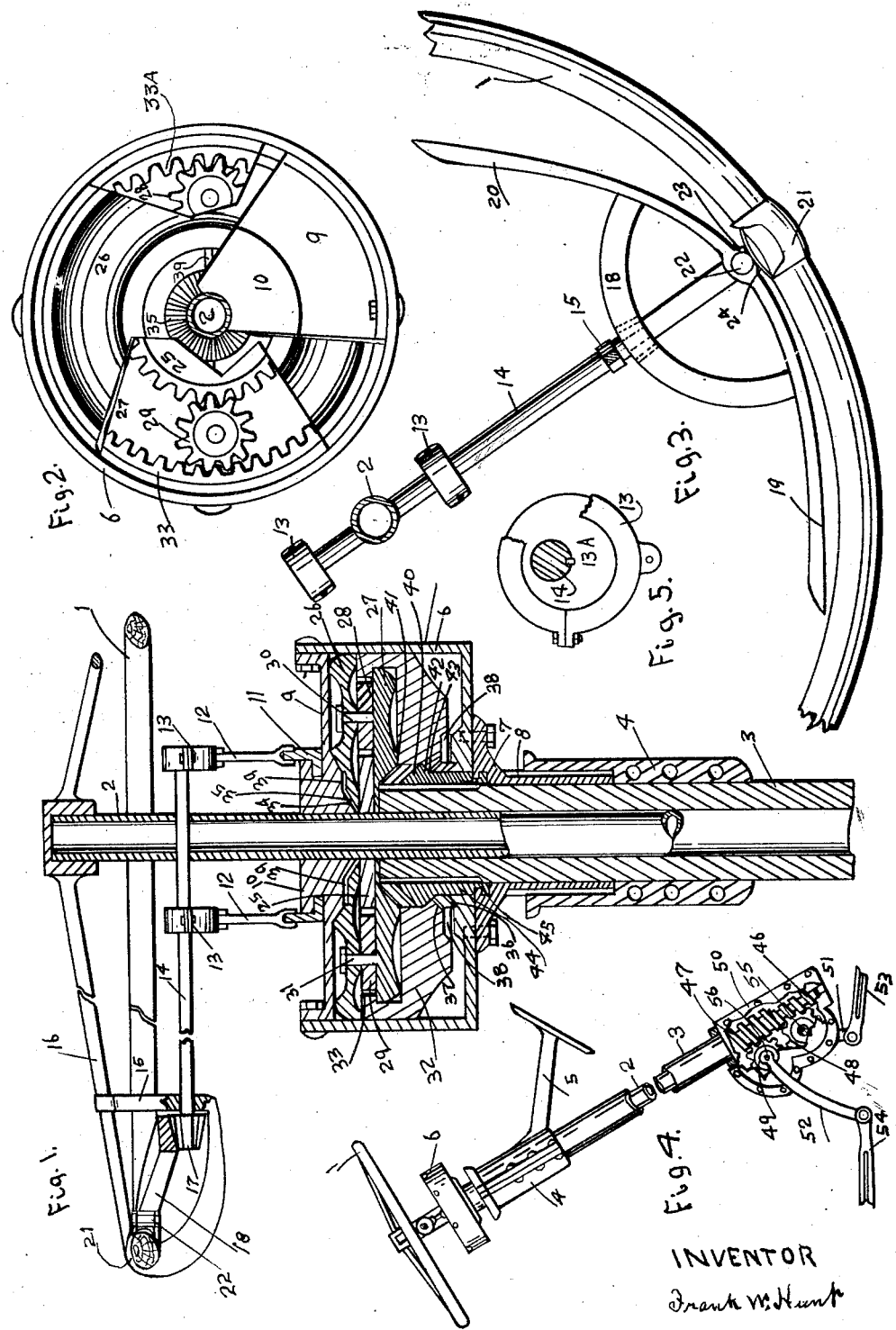
INVENTOR
Frank W. Hunt Patented Jan. 7, 1930

1,742,352

UNITED STATES PATENT OFFICE

FRANK W. HUNT, OF SEATTLE, WASHINGTON

AUTOMOTIVE VEHICLE STEERING DEVICE

Application filed January 29, 1926. Serial No. 84,626.

This invention relates generally to improvements in automotive vehicle steering means and particularly to a means for applying a steering movement simultaneously to both forward and rear road wheels.

The main objects of this invention are:

First, to provide a means whereby a steering movement may be communicated to both forward and rear road wheels at the same time by one person using only one steering wheel or lever.

Second, to provide a means whereby an automotive vehicle may be turned in a relatively small space by directing the forward wheels in the direction of turning, and the rear wheels in the opposite direction.

Third, to provide a means whereby such a vehicle may be given a sideward movement by directing both forward and rear wheels in the same direction, and, Fourth, to provide a means whereby one person, using the ordinary steering wheel or lever in the usual way, may effect, at will, in a moving automotive vehicle, either a sharp turning movement, by directing the forward and rear wheels in opposite directions, or a sideward movement, by directing both forward and rear wheels in the same direction.

Further objects of the device as a whole, as well as objects relating to structural details, will definitely appear from the following detailed description.

In the drawing:

Fig. 1 is a vertical longitudinal section through the upper portion of a steering apparatus showing a section through the housing and the gears and clutches contained therein whereby changes of steering movement are made from a turning to a sideward movement.

Fig. 2, a top plan view of said housing with portions broken away to show certain gear members.

Fig. 3, a top view of a portion of a steering wheel showing means provided to actuate the clutch members shown in Figures 1 and 2.

Fig. 4, a broken elevation of a steering column, portions of the housings of the worms and gears being removed to illustrate the means for transmitting motion to both forward and rear wheels; and, Fig. 5, a somewhat enlarged detail view of one of the eccentric wheels and its yoke.

In the drawings, in which similar reference characters refer to similar parts, numeral 1 represents the rim of a steering wheel, 2 the inner steering shaft and 3 the outer steering shaft. 4 denotes a jacket through which the shafts extend, and which is adapted to be attached by shank 5 to the body portion of the vehicle.

6 is a circular casing or housing through the center of which the steering shafts extend, one within the other in rotatable relation, the outer shaft, however, terminating within the casing, while the inner shaft reaches upwardly to be fixedly attached to the steering wheel.

At the bottom of casing 6 is bolted a circular base member 7 through which the outer steering shaft 3 is journalled. The base member 7 carries a sleeve 8 at its bottom which is slidably splined into the upper portion of the jacket 4. The casing 6 is thus prevented from rotating with the steering shafts, but may be lifted and lowered.

The casing 6 is closed at the top by the circular member 9 through which the inner steering shaft is journalled. A collar portion 10 is formed on the top of the casing and is rotatably engaged with the complementary collar member 11.

A pair of connecting rods 12—12 form a hinged connection between the members 10 and 11 and the yokes 13—13 of a pair of eccentric wheels 13A—13A carried in the yokes, the wheels being keyed to the shaft 14 which passes transversely through the inner steering shaft between the eccentrics. The shaft 14 is journalled through the brace member 15 which is fixed to rim 1 and a spoke 16 of the spider of the steering wheel. A bevel gear 17 is keyed to the end of the shaft 14 adjacent the brace 15. A sector 18, having cogs on its inner side which mesh with those of the bevel gear, is fixed at its ends to a pair of lever arms 19 and 20. This pair of lever arms is secured to the rim 1 of the steering wheel by the rigid strap 21 by means of the pin 22 which is revolubly mounted in the inner body portion of said strap. The pin 22 carries on its side adjacent the rim 1 a rib 23 which is adapted to cooperate with the spring 24 to retain the lever arms 19 and 20 in the extreme position to which they may be turned. An inspection of Figures 1 and 3 will show that moving the lever arms from one side to the other will rotate the eccentric wheels, thereby lifting or lowering the casing 6.

Within the casing 6 a central gear wheel 25 is rigidly fixed to the inner steering shaft 2. A pair of disk shaped members 26 and 27 are positioned, respectively, above and below the gear wheel 25, the inner steering shaft passing through their centers. Between these disk members, and positioned to mesh with the gear wheel 25, are the pinions 28 and 29, revolubly secured to the disk members by the pins 30 and 31. Positioned immediately below the disk member 27 is a cup shaped member 32 whose inwardly bearing upper rim 33 carries internal gears 33A adapted to mesh with the pinions 28 and 29.

The top member 9 of the casing 6 has formed on its inner side a male clutch member 34 adapted to engage the female clutch member 35 which is formed in the upper side of the upper disk member 26, while the bottom of the casing 6 carries a male clutch member 36 for which a complementary female clutch member 37 is formed in the bottom of the cup shaped member 32. Both of these clutches are preferably of the cone type, and are characterized by having single tongue and groove extensions disposed transversely of their vertical axes, the lower extensions being designated 38—38, and the upper 39—39. It will be apparent from an examination of this arrangement that when the casing 6 is either lifted or lowered, thereby engaging one pair of clutch members and disengaging the other pair, that if a turning movement of the steering wheel is made, the complementary members of the tongue and groove portions of the disengaged clutch will move out of alignment with each other and that this will prevent a vertical movement of the casing again until the tongue and groove members are brought back into alignment. The object of this is to prevent changing from a turning movement of the vehicle to a sideward movement at any time except while forward and rear road wheels are in alignment, as the wheels would remain out of alignment if the change of steering movement were made while they were not in aligned position.

The outer hollow steering shaft 3, extends into, and terminates centrally of the casing 6, and at its upper end within the casing, is slidably splined into a double cone clutch body having an upper male member 40 adapted to engage with a female member 41 formed in the bottom of the lower disk member 27, and a lower male member 42 adapted to engage the female member 43 formed on the inner side of the bottom portion of the cup shaped member 32. This double cone clutch member is provided with a downwardly extending sleeve 44 which is rotatably collared into the base member 7 secured to the bottom of the casing 6, the collar being denoted by the numeral 45. This collar provides a means whereby the double cone clutch will be lifted or lowered with the casing, at the same time enabling the clutch body to turn within the casing with the female member with which it may be engaged.

The inner steering shaft 2 extends downwardly through the outer steering shaft 3, and at its lower extremity carries the worm gear 46, while immediately above this the outer steering shaft terminates in a worm gear 47. A gear wheel 48 engages the worm 46, and a similar wheel 49 engages the worm 47. These wheels and the worm gears are mounted within the housing 50 which may be rigidly secured to a suitable part of the vehicle frame. A pair of lever arms 51 and 52 are, respectively, afforded hinged connection at their lower ends to the forward and rearward drag links 53 and 54, and at their upper ends are rigidly fixed to the outwardly extending shafts 55 and 56 journalled through the housing 50 and on which the gear wheels 48 and 49 are, respectively, mounted. The forward and rearward drag links may extend to the forward and rear steering knuckles, not here shown, to be connected therewith in the usual manner.

In Figure 1 of the drawing, the clutch member 34 on the upper casing member 9 is shown engaged with the upper disk member 26, while the lower clutch member 36 is disengaged from the bottom of the cup shaped member 32. At the same time the double cone clutch has its male member 40 disengaged from the bottom of the lower disk member 27, and its male member 42 engaged with the clutch 43 on the upper side of the cup shaped member 32. If it be assumed that the turning of the steering wheel while the clutches are in the positions shown will result, through the drag link connections, in directing the forward and rear road wheels in opposite directions for a turning movement, then, in order to reverse the mechanism so that turning the steering wheel will result in directing both forward and rear wheels in the same direction, to produce a sideward movement, one of the operator's hands grasping one side of the steering wheel rim would grasp the lever arm 20, Figure 3, drawing it against the rim 1 of the steering wheel. It will be obvious that this movement of the lever arm will turn the eccentric wheels in their yokes 13—13 which will result in lifting the casing 6. The upper clutch member 34 will be disengaged from the upper disk member 26 leaving it with its mate, disk 27, free to rotate. At the same time the lower clutch member 36 will engage and hold in stationary relation the cup shaped member 32, while the lower member 42 of the double cone clutch will be disengaged from its complementary member 43, and its upper male member 40 will be engaged with the bottom of the lower disk member 27. If the steering wheel be then turned, the central gear wheel 25, turning with it, will rotate the pinions 28 and 29 in an opposite direction. Since the internally geared member 32 is held in stationary relation by the lower clutch member 36, and the pair of disks 26 and 27, being now disengaged at the top from clutch member 34 and free to rotate, the pinions 28 and 29, meshing with the gears 33A and the gear wheel 25, will revolve around the latter in its direction of turning carrying with them the disk members 26 and 27. Since the upper member 40 of the double cone clutch is engaged with the bottom of disk 27, and is also splined with the outer steering shaft 3, the latter will turn with the disks, which is to say both outer and inner steering shafts will turn in the same direction.

The ratio of the gearing shown will result in the gear wheel 25 turning approximately twice as rapidly as either the disk members with their pinions, or the rim member 33. This would result in the inner steering shaft turning twice as far as the outer steering shaft during any steering movement. This difference in extent of turning movement, however, is compensated for by the fact that the outer shaft, which has the slower movement, terminates at the bottom above the inner shaft, and the lever 52 which it actuates may be given a greater length than that of the lever 51 which is actuated by the faster moving inner shaft. To give both forward and rear wheels the same extent of steering movement, the ratio of lengths of these lever arms should be substantially the same as the ratio of diameters of gear 25 and internal gear 33A.

Among other useful objects accomplished by my invention is that of enabling a driver to turn a vehicle, even though it have a very long wheel base, on a relatively limited space, or at will, by the simple pressure of the fingers against a lever on the rim of the steering wheel, reverse a mechanism to make an abrupt sideward movement. The advantage of this sideward movement in parking a vehicle in a confined space with little or no maneuvering will be obvious. The device is similarly useful in avoiding rear end clashes between vehicles passing each other. In many cases the driver has time to steer the front end of his vehicle out of the path of another approaching only to strike it with the rear end of his. With my device the rear end of a vehicle is as quickly moved to one side as the front end. The device is simple and will not easily get out of order. It requires no more than the usual skill in the operator, since the change of steering movement is effected by a simple pressure of the fingers on one of the small levers on the steering wheel rim, at the same time turning the latter so that the road wheels pass through the position of alignment with each other. As this position is being passed through, pressure being applied to the proper lever, the shifting of the clutch mechanism will take place.

In addition to use on automotive vehicles, the device may be utilized for steering water or air craft, or any moving body capable of responding to steering movements applied simultaneously at two, or more, points.

I claim:

1. In a steering device, the combination, with a steering hand piece, of a pair of upwardly extending steering shafts, said shafts having drag link steering connections at their lower extremities adapted to effect separate steering movements, said steering hand piece having connections with one of said shafts adapted to communicate a turning movement thereto, means whereby said turning movement may be simultaneously communicated to the other shaft, either in the same direction, or in the opposite direction, means whereby the action of said first mentioned means may be reversed from a turning movement in one direction to a turning movement in the opposite direction, and means whereby the turning movement of each shaft may operate to produce separate, substantially horizontal, longitudinal movements in said drag link connections.

2. In a steering device having a single steering hand piece and a pair of steering connections for communicating separate steering movements to forward and rear steering elements, a hollow outer steering shaft, an inner steering shaft extending longitudinally through said outer steering shaft, and having one extremity fixed to said steering hand piece to receive a turning movement therefrom, means for simultaneously communicating said turning movement from the inner to the outer shaft, either in the same, or the opposite direction, means for controlling said first mentioned means, worm gear connections at one extremity of said outer shaft, similar worm gear connections on said inner shaft adjacent those on said outer shaft, and operable connection between each worm gear and one of said steering connections.

3. In a steering device having a single steering hand piece and connections adapted to communicate steering movements to the forward and rear parts of a moving body, the combination of a hollow outer steering shaft, an inner steering shaft extending longitudinally through the outer steering shaft, and having operable connection at one end with said steering hand piece to receive a steering movement therefrom, gear mechanism connected with said inner shaft for communicating its turning movement to said outer shaft, either in the same direction, or in the opposite direction, means associated with said steering hand piece for controlling the direction of turning movement communicated by the inner shaft to the outer shaft, mechanism operably connected to one shaft adapted to afford steering connection to the forward part of said moving body, mechanism operably connected to the other shaft adapted to afford steering connection to the rear part of said body.

4. In a steering device provided with a single steering hand piece and connections adapted to convey separate steering movements, a hollow outer steering shaft, an inner steering shaft extending longitudinally through said outer shaft and having connection at its upper end with said steering hand piece for receiving a turning movement therefrom, the outer shaft terminating at its upper extremity below the upper end of the inner shaft, a housing surrounding both shafts at the upper extremity of the outer shaft, said housing being relatively axially movable and non-rotatable, a gear fixed to the inner shaft within the housing, a pair of pinions rotatably carried between an upper and a lower disk member, and adapted to mesh with said gear, a cup shaped member having internal gears on its upwardly extending rim, positioned so that said internal gears mesh with said pinions, a double clutch body comprising an upper member and a lower member rotatably fixed to the bottom of said housing, and slidably splined with said outer shaft, a clutch member on said lower disk member complementary to the upper member of said double clutch body, a clutch member on the upper side of the bottom of said cup shaped member complementary to the lower member of said double clutch body, a clutch member on the upper end of said housing adapted to engage a complementary clutch member on said upper disk member, a clutch member on the bottom of said housing adapted to engage a complementary clutch member on the under side of the bottom of said cup shaped member, and means for lifting and lowering said housing for simultaneously engaging certain of said clutch members, and disengaging the other clutch members.

5. In a steering device provided with a pair of steering shafts having operable connection with a single steering hand piece, and connections adapted to convey separate steering movements, the combination therewith of gear mechanism cooperating with clutch mechanism to communicate a turning movement from one shaft to the other, either in the same direction, or in the opposite direction, a housing having connection with said clutch mechanism, non-rotatably and axially slidably mounted to enclose said gear and clutch mechanism, a connecting link hingedly fixed at one end to said housing, and in rotatable relation therewith, the other end of said link being hingedly fixed to an eccentric yoke, an eccentric wheel in said yoke, means associated with said steering hand piece having connections to communicate a turning movement to said eccentric wheel to effect the lifting or lowering of said casing.

6. In a steering device, including mechanism adapted to communicate separate steering movements to separate parts of a dirigible body, either in the same or in opposite directions, and having a steering hand piece for originating said steering movements, a lever attached to said hand piece and having operable connection with said mechanism, for controlling the directions of said separate steering movements relative to each other.

7. In a steering device having operative steering connections with separate portions of a dirigible body, and including a steering hand piece, the combination of a pair of steering shafts operatively connected at one end with said hand piece, and adapted to receive separate steering movements therefrom, either in the same or in opposite directions, and means whereby said steering movements may be communicated from said shafts to said steering connections.

8. In a steering device adapted to communicate steering movement to two or more parts of a dirigible body, and including steering connections to said parts, clutch and gear mechanism to control the movements of said connections, including a pair of rotatable members oppositely disposed to each other, each member bearing one of a pair of complementary clutch elements, a pair of non-rotatable axially movable members fixedly held in spaced relation to each other, and each disposed adjacent one of said rotatable members and bearing the clutch element complementary to that clutch element in said adjacent rotatable member, means for communicating axial movement to said non-rotatable members to effect the engagement of one pair of said clutch elements and the disengagement of the other pair, said pairs of clutch elements consisting each of a projection and corresponding depression, and being disposed so that engagement of one pair and disengagement of the other pair can take place only when the disengaged rotating member is in a certain position with respect to the adjacent non-rotating member.

9. In a steering device adapted to communicate separate steering movements to separate parts of a dirigible body, and including connections for communicating movements to said parts, a pair of steering shafts comprising an inner shaft extending longitudinally through an outer shaft, two units of gear mechanism, a pair of axially slidable non-rotatable clutch members, each member disposed adjacent one of said units of gear mechanism, and in fixed spaced relation to the other member, the units of gear mechanism each bearing clutch elements complementary to the adjacent clutch member, and each being so disposed that when one is held in fixed relation by the adjacent clutch the other will be declutched and rotatable, a double clutch body slidably fixed to the outer shaft and positioned between said units of gear mechanism, and rotatably fixed to one of said non-rotatable clutch members, clutch elements in each of the units of gear mechanism complementary to the adjacent portion of the double clutch body, said double clutch body being so disposed as to be in clutched relation to that unit of gear mechanism which is declutched from the adjacent non-rotatable clutch member, means for slidably moving said non-rotatable clutch members, and means for communicating a turning movement to said inner shaft.

FRANK W. HUNT.